US010129921B2

United States Patent
Huang-Fu et al.

(10) Patent No.: US 10,129,921 B2
(45) Date of Patent: Nov. 13, 2018

(54) ENHANCED PS DOMAIN DATA-OFF MECHANISM

(71) Applicant: MEDIATEK INC., Hsinchu (TW)

(72) Inventors: Chien-Chun Huang-Fu, Hsinchu (TW); Mohamed Abdelrazek El-Saidny, Dubai (AE); Yuan-Chieh Lin, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/862,644

(22) Filed: Jan. 5, 2018

(65) Prior Publication Data

US 2018/0199395 A1    Jul. 12, 2018

Related U.S. Application Data

(60) Provisional application No. 62/443,010, filed on Jan. 6, 2017.

(51) Int. Cl.
  *H04W 4/00* (2018.01)
  *H04W 76/16* (2018.01)
  (Continued)

(52) U.S. Cl.
  CPC ........... *H04W 76/16* (2018.02); *H04W 88/16* (2013.01); *H04W 28/08* (2013.01); *H04W 36/14* (2013.01); *H04W 84/12* (2013.01); *H04W 88/02* (2013.01)

(58) Field of Classification Search
  CPC ..... H04W 76/16; H04W 88/16; H04W 36/14; H04W 84/12; H04W 88/02; H04W 28/08
  (Continued)

(56) References Cited

U.S. PATENT DOCUMENTS 6,628,671 B1 * 9/2003 Dynarski ............ H04L 12/2856
                                                            370/389
10,274,045          11/2011 Wu .............................. 370/328
                    (Continued)

FOREIGN PATENT DOCUMENTS

CN          102238085 A      11/2011
WO     WO2015158363 A1      10/2015

OTHER PUBLICATIONS

International Search Report and Written Opinion of International Search Authority for PCT/CN2018/071743 dated Mar. 27, 2018 (9 pages).

(Continued)

*Primary Examiner* — Marceau Milord
(74) *Attorney, Agent, or Firm* — Imperium Patent Works; Zheng Jin (57) ABSTRACT

Solutions are proposed to facilitate the support of 3GPP PS_Data_Off feature. The PS_Data_Off feature prevents transport via 3GPP access of all IP packets except those related to 3GPP PS_Data_Off Exempt Services. In one example, signaling storms due to frequent PS_Data_Off reconfiguration are prevented. In another example, for multi-SIM devices and for devices that supporting WiFi access, UE reconfigures the PS_Data_Off feature upon a triggering condition is satisfied. In yet another example, upon status change of PS_Data_Off feature, UE initiates RAT change to improve performance, to reduce power consumption and cost, and to maintain service continuity. Furthermore, new AT commands and parameters are introduced to enable the PS_Data_Off feature.

19 Claims, 10 Drawing Sheets

(51) Int. Cl.
*H04W 88/16* (2009.01)
*H04W 36/14* (2009.01)
*H04W 84/12* (2009.01)
*H04W 88/02* (2009.01)
*H04W 28/08* (2009.01)

(58) Field of Classification Search
USPC .................................. 455/432.1, 436, 435.1
See application file for complete search history.

(56) References Cited

U.S. PATENT DOCUMENTS

| | | | | |
|---|---|---|---|---|
| 8,588,163 B2* | 11/2013 | Lin | .................... | H04W 74/085 |
| | | | | 370/328 |
| 8,626,162 B2* | 1/2014 | Deshpande | ........... | H04W 48/16 |
| | | | | 370/329 |
| 8,838,108 B2* | 9/2014 | Swaminathan | ... | H04W 36/0061 |
| | | | | 370/338 |
| 8,977,257 B2* | 3/2015 | Horn | .................... | H04W 8/186 |
| | | | | 370/310 |
| 9,037,141 B2* | 5/2015 | Liao | ........................ | H04W 8/12 |
| | | | | 455/435.1 |
| 9,224,169 B2* | 12/2015 | Smith | ............... | H04W 28/0226 |
| 9,295,095 B2* | 3/2016 | Rayavarapu | ........ | H04W 76/046 |
| 9,516,591 B2* | 12/2016 | Jheng | ................ | H04W 52/0212 |
| 9,554,223 B2* | 1/2017 | Hillbratt | .............. | H04R 25/606 |
| 9,717,054 B2* | 7/2017 | Qian | ................ | H04W 52/0229 |
| 9,743,310 B2* | 8/2017 | Rubin | ............... | H04W 28/0226 |
| 9,769,750 B2* | 9/2017 | Jheng | ................ | H04W 52/0212 |
| 9,900,801 B2* | 2/2018 | Papa | ................ | H04W 28/0289 |
| 9,980,224 B2* | 5/2018 | Saed | ................ | H04W 52/0225 |
| 2008/0111785 A1* | 5/2008 | Cernasov | ................ | G02F 1/167 |
| | | | | 345/107 |
| 2011/0086670 A1* | 4/2011 | Shin | ..................... | H04W 8/205 |
| | | | | 455/558 |
| 2011/0116427 A1* | 5/2011 | Chang | ............... | H04W 52/0216 |
| | | | | 370/311 |
| 2012/0115454 A1* | 5/2012 | Liao | ........................ | H04W 60/02 |
| | | | | 455/418 |
| 2012/0238236 A1* | 9/2012 | Liao | ....................... | H04W 76/50 |
| | | | | 455/404.2 |
| 2012/0238270 A1* | 9/2012 | Arava | ................... | H04W 8/183 |
| | | | | 455/435.2 |
| 2012/0257571 A1* | 10/2012 | Liao | ........................ | H04W 4/70 |
| | | | | 370/328 |
| 2013/0100795 A1* | 4/2013 | Zhao | ................. | H04W 36/0016 |
| | | | | 370/216 |
| 2013/0107863 A1* | 5/2013 | Faccin | .............. | H04W 36/0022 |
| | | | | 370/331 |
| 2013/0182644 A1* | 7/2013 | Kim | .................... | H04W 76/025 |
| | | | | 370/328 |
| 2013/0201870 A1* | 8/2013 | Gupta | ..................... | H04W 4/70 |
| | | | | 370/254 |
| 2014/0029530 A1* | 1/2014 | Kim | ....................... | H04W 48/10 |
| | | | | 370/329 |
| 2014/0136709 A1* | 5/2014 | Chin | ......................... | H04W 4/12 |
| | | | | 709/226 |
| 2014/0334427 A1* | 11/2014 | Sun | ......................... | H04W 76/18 |
| | | | | 370/329 |
| 2014/0355429 A1* | 12/2014 | Smith | ............... | H04W 28/0226 |
| | | | | 370/230 |
| 2014/0355443 A1* | 12/2014 | Smith | ............... | H04W 28/0289 |
| | | | | 370/235 |
| 2014/0357285 A1* | 12/2014 | Smith | .................... | H04W 48/17 |
| | | | | 455/450 |
| 2016/0044531 A1* | 2/2016 | Papa | ................. | H04W 28/0247 |
| | | | | 370/230 |
| 2016/0197781 A1* | 7/2016 | Smith | .................. | H04L 41/0806 |
| | | | | 370/254 |
| 2016/0198360 A1* | 7/2016 | Smith | ............... | H04W 28/0289 |
| | | | | 370/237 |
| 2016/0219451 A1* | 7/2016 | Gupta | ................ | H04W 72/005 |
| 2016/0261754 A1 | 9/2016 | Keller et al. | ................... | 455/406 |
| 2016/0316402 A1 | 10/2016 | Shi et al. | ........................ | 370/331 |
| 2017/0181084 A1* | 6/2017 | Sun | .................... | H04W 52/0235 |
| 2017/0295536 A1* | 10/2017 | Kim | ....................... | H04W 48/06 |

OTHER PUBLICATIONS

S2-166843, SA WG2 Meeting #118, Nokia et al., "Introduction of PS Data Off Feature", Nov. 14-18, 2016, Reno Nevada, USA (29 pages).
S2-165581, SA WG2 Meeting #117, Huawei et al, "New Solution for Key Issue #1", Oct. 17-21, 2016, Kaohsiung, Taiwan (2 pages).
3G TS 23.228 V1.4.0 (Nov. 2000), 3rd Generation Partnership Project; Technical Specification Group Services and System Aspects; IP Multimedia (IM) Subsystem—Stage 2 (3G TS 23.228 version 1.4.0).
International Search Report and Written Opinion of International Search Authority for PCT/CN2018/071744 dated Mar. 27, 2018 (9 pages).
3GPP TS 22.011 V14.3.0 (Jun. 2016), 3rd Generation Partnership Project; Technical Specification Group Services and System Aspects; Service accessibility (Release 14) Section 1, 10.
S1-163227 3GPP TSG-SA WG1 Meeting #76, BlackBerry UK Ltd, "Enable CS Equivalent Services for PS Data Off Exempted Services", Nov. 7-11, 2016, Tenerife, Spain (2 pages).
3GPP TR 23.702 V14.0.0 (Dec. 2016), 3rd Generation Partnership Project Technical Specification Group Services and System Aspects; Study on 3GPP PS Data Off (Release 14).
USPTO, office action for the related U.S. Appl. No. 15/862,646 dated Jun. 13, 2018 (14 pages).

* cited by examiner

- [Basic Version] PS Data Off Configuration +CPSDO

| Command | Possible response(s) |
| --- | --- |
| (#1)+CPSDO=[<PS_Data_Off>]<br>(#2)+CPSDO=[<PS_Data_Off>[,<IMS_requirement>]]<br>Note: <PS_Data_Off> could a bitmap or a combination of the following parameters:<br>- <PS_Data_Off_roaming>,<PS_Data_Off_non-roaming><br>- <PS_Data_Off_SIP>,<PS_Data_Off_non-SIP><br>-<br><PS_Data_Off_Roaming_SIP>,<PS_Data_Off_Roaming_non-SIP>,<PS_Data_Off_non-Roaming_SIP>,<PS_Data_Off_non-Roaming_non-SIP> | +CME ERROR: <err> |
| +CPSDO? | (#1)+CPSDO: [<PS_Data_Off>]<br>(#2)+CPSDO: [<PS_Data_Off><br>[,<IMS_requirement>]] |
| +CPSDO=? | (#1)+CPSDO: (list of supported <PS_Data_Off>s)<br>(#2)+CPSDO: (list of supported <PS_Data_Off>s), (list of supported <IMS_requirement>s) |

FIG. 12

| COMMAND | POSSIBLE RESPONSE(S) |
|---|---|
| +CGDCONT=[<cid>[,<PDP_type>[,<APN>[,<PDP_addr>[,<d_comp>[,<h_comp>[,<IPv4AddrAlloc>[,<request_type>[,<P-SCF_discovery>[,<IM_CN_Signalling_Flag_Ind>[,<NSLPI>[,<securePCO>[,<IPv4_MTU_req>][,<PS_Data_Off>]]]]]]]]]]]]]<br>(SET) | |
| +CGDCONT?<br>(READ) | [+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_req>][,<PS_Data_Off>]]]]]]]<br>[<CR><LF>+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_req>][,<PS_Data_Off>]]]]]]]<br>[...]] |
| +CGDCONT=?<br>(TEST) | +CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(range of supported <securePCO>s),(list of supported <IPv4_MTU_req>s),(list of supported <PS_Data_Off>s)<br><br>[<CR><LF>+CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(range of supported <securePCO>s),(list of supported <IPv4_MTU_req>s),(list of supported <PS_Data_Off>s)<br>[...]] |

FIG. 13

| COMMAND | POSSIBLE RESPONSE(S) |
|---|---|
| +CGCONTRDP[=<cid>]<br>(READ) | [+CGCONTRDP: <cid>,<bearer_id>,<apn>[,<local_addr and subnet_mask><br>[,<gw_addr>[,<DNS_prim_addr>[,<DNS_sec_addr>[,<P-CSCF_prim_addr><br>[,<P-CSCF_sec_addr>[,<IM_CN_Signalling_Flag>[,<LIPA_indication><br>[,<IPv4_MTU>][,<PS_Data_Off>]]]]]]]]]]<br>[<CR><LF>+CGCONTRDP: <cid>,<bearer_id>,<apn>[,<local_addr and subnet_mask><br>[,<gw_addr>[,<DNS_prim_addr>[,<DNS_sec_addr>[,<P-CSCF_prim_addr><br>[,<P-CSCF_sec_addr>[,<IM_CN_Signalling_Flag>[,<LIPA_indication><br>[,<IPv4_MTU>][,<PS_Data_Off>]]]]]]]]]<br>[...]] |
| +CGCONTRDP=?<br>(TEST) | CGCONTRDP: (list of <cid>s associated with active contexts) |

FIG. 14

| COMMAND | POSSIBLE RESPONSE(S) |
|---|---|
| (#1)+CAPSDO=[<apn>[,<PS_Data_Off>]]<br>(#2)+CAPSDO=[<apn>[,<PS_Data_Off><br>[,< IMS_requirement >]]] | +CME ERROR: <err> |
| +CPSDO?<br>(READ) | (#1)[+CAPSDO: <apn>, <PS_Data_Off><br>[<CR><LF>+CAPSDO: <apn>, <PS_Data_Off>]<br>[...]]<br>(#2)[+CAPSDO:<br><apn>, <PS_Data_Off>[,<IMS_requirement>]<br>[<CR><LF>+CAPSDO: <apn>,<br><PS_Data_Off>[,<IMS_requirement>]]<br>[...]] |
| +CPSDO=?<br>(TEST) | (#1)+CAPSDO:(list of supported <PS_Data_Off>s)<br>(#2)+CAPSDO:(list of supported <PS_Data_Off>s),(list of supported <IMS_requirement>s) |

FIG. 15

| COMMAND | POSSIBLE RESPONSE(S) |
|---|---|
| +CABTRDP[=<apn>] (READ) | [+CABTRDP: <apn>,<residual_backoff_timer>[,<re-attempt_rat_indicator>[,<re-attempt_eplmn_indicator>[,<NSLPI>][,<PS_Data_Off>]]]]<br>[<CR><LF>+CABTRDP :<apn>,<residual_backoff_timer>[,<re-attempt_rat_indicator>[,<re-attempt_eplmn_indicator>[,<NSLPI>][,<PS_Data_Off>]]]<br>[...]] |
| +CABTRDP=? (TEST) | +CABTRDP: (list of supported <re-attempt_rat_indicator>s),(list of supported <re-attempt_eplmn_indicator>s),(list of supported <NSLPI>s), (list of supported <PS_Data_Off>s) |

ENHANCED PS DOMAIN DATA-OFF MECHANISM

CROSS REFERENCE TO RELATED APPLICATIONS

This application claims priority under 35 U.S.C. § 119 from U.S. Provisional Application No. 62/443,010, entitled "Enhanced PS Domain Data-Off Mechanism", filed on Jan. 6, 2017, the subject matter of which is incorporated herein by reference.

TECHNICAL FIELD

The disclosed embodiments relate generally to wireless communication, and, more particularly, to method of supporting enhanced PS domain data-off mechanism in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards.

LTE networks are packet-switched (PS) IP networks. This means that the networks deliver all data traffic in IP packets, and provide users with Always-On IP Connectivity. When UE joins an LTE network, a Packet Data Network (PDN) address (i.e., the one that can be sued on the PDN) is assigned to the UE for its connection to the PDN. LTE calls the users "IP access connection" an evolved packet system (EPS) bearer, which is a connection between the UE and the PDN gateway (P-GW). The P-GW is the default gateway for the UEs IP access. LTE has defined a Default EPS Bearer to provide the Always-On IP Connectivity. By introducing Always-On IP Connectivity in 3GPP network, it became difficult for the subscriber to have explicit control of the traffic sent or received by its UE, which could lead to unexpected charging.

3GPP PS_Data_Off feature is thus introduced to meet the requirements. The PS_Data_Off feature prevents transport via 3GPP access of all IP packets except those related to 3GPP PS_Data_Off Exempt services. The UE discovers a P-GW supports 3GPP PS_Data_Off feature at initial attach and during the establishment of a PDN connection via the presence of the 3GPP PS_Data_Off Support Indication in the Create Session response message. When the UE requests a new PDN connectivity, the UE shall include the indication in the PCO within the PDN Connectivity Request message. When the UE changes its PS_Data_Off status, the UE shall report a change of its 3GPP PS_Data_Off status in PCO by using Bearer Resource Modification procedure. For IP Multimedia Subsystem (IMS) services, the UE shall inform the IMS domain in initial REGISTER request and subsequent re-REGISTER request.

As a result, the support of 3GPP PS_Data_Off feature introduce more issues and requirements that need to addressed.

SUMMARY

Solutions are proposed to facilitate the support of 3GPP PS_Data_Off feature. The PS_Data_Off feature prevents transport via 3GPP access of all IP packets except those related to 3GPP PS_Data_Off Exempt Services. In one example, signaling storms due to frequent PS_Data_Off reconfiguration are prevented. In another example, for multi-SIM devices and for devices that supporting WiFi access, UE reconfigures the PS_Data_Off feature upon a triggering condition is satisfied. In yet another example, upon status change of PS_Data_Off feature, UE initiates RAT change to improve performance, to reduce power consumption and cost, and to maintain service continuity. Furthermore, new AT commands and parameters are introduced to enable the PS_Data_Off feature.

In one embodiment, a UE establishes one or more packet data network (PDN) connections in a mobile communication network. The UE is configured with packet-switched PS_Data_Off active or inactive. The UE performs a PS_Data_Off configuration change and transmits an indication to the network for indicating the PS_Data_Off configuration change. The UE starts a timer in response to the configuration change. The UE performs a subsequent PS_Data_Off configuration change while the timer is running. The UE is prohibited from sending a subsequent indication to the network for the subsequent PS_Data_Off configuration change.

In another embodiment, a UE establishes one or more packet data network (PDN) connections in a mobile communication network. The UE is configured with packet switch PS_Data_Off active or inactive. The UE detects a triggering condition for PS_Data_Off configuration change. The UE transmits an indication to the network for indicating PS_Data_Off is active if the triggering condition is satisfied. The UE changes the PS_Data_Off configuration to inactive when the condition is no longer satisfied. The UE transmits another indication to the network for indicating PS_Data_Off is inactive.

In another embodiment, a UE establishes a packet data network (PDN) connection in a mobile communication network. The UE access the network using an original radio access technology (RAT) for IP service. The UE performs a PS_Data_Off configuration change and transmitting an indication to the network for indicating the configuration change. The UE determining a triggering condition to change to a target RAT upon the PS_Data_Off configuration change. The UE changes to the target RAT when the triggering condition is satisfied. The UE is able to improve performance or continue to receive a specific IP service using the target RAT upon the configuration change.

In yet another embodiment, a UE establishes one or more packet data network (PDN) connections with a PDN gateway (PGW) in a mobile communication network. The PGW supports turning off packet-switched data traffic by activating a PS_Data_Off feature. The UE transmits a command from an Application Processor (AP) to a modem. The command is related to the PS_Data_Off feature. The UE transmits an PS_Data_Off indication from the modem to the network in response to the command, wherein the indication indicates a PS_Data_Off configuration or retrieves a PS_Data_Off status.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
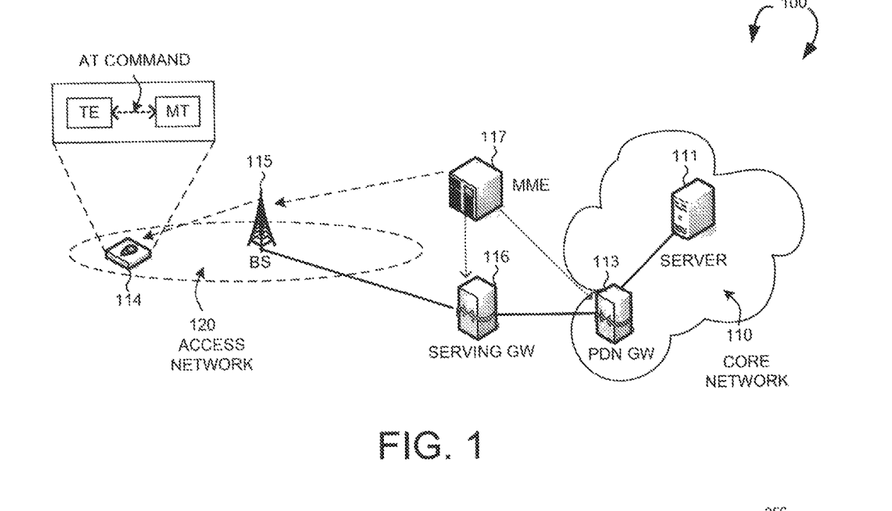
FIG. 1 illustrates an exemplary LTE network with supporting enhanced PS domain data-off mechanism in accordance with one novel aspect.

FIG. 1 illustrates an exemplary LTE network 100 with supporting enhanced PS domain data-off mechanism in accordance with one novel aspect. LTE network 100 comprises application servers including an IP multimedia subsystem (IMS) server 111 that provides various services by communicating with a plurality of user equipments (UEs) including UE 114. In FIG. 1, IMS server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). IMS server 111 communicates with UE 114 through PDN GW 113, serving GW 116, and BS 115. A mobility management entity (MME) 117 communicates with BS 115, serving GW 116 and PDN GW 113 for mobility management of wireless access devices in LTE network 100. UE 114 may be equipped with a single radio frequency (RF) transceiver or multiple RF transceivers for services via different RATs/CNs. UE 114 may be equipped with a single Subscriber Identification Module (SIM) or multiple SIMs. UE 114 may be a smart phone, a wearable device, an Internet of Things (IoT) device, a tablet, etc. In one example, UE 114 comprises a terminal equipment (TE) and a mobile terminal (MT) that support Attention (AT) commands for communicating with each other.

LIE networks are packet-switched (PS) IP networks. This means that the networks deliver all data traffic in IP packets, and provide users with Always-On IP Connectivity. When UE joins an LTE network, a Packet Data Network (PDN) address (i.e., the one that can be sued on the PDN) is assigned to the UE for its connection to the PDN. LTE calls the UE's "IP access connection" an evolved packet system (EPS) bearer, which is a connection between the UE and the P-GW. The P-GW is the default gateway for the UE's IP access. LTE has defined a Default EPS Bearer to provide the Always-On IP Connectivity. By introducing Always-On IP Connectivity in 3GPP network, became difficult for the subscriber to have explicit control of the traffic sent or received by its UE, which could lead to unexpected charging. 3GPP PS_Data_Off feature is thus introduced to meet the requirements. The PS_Data_Off feature, when active, prevents transport via 3GPP access of all IP packets in both uplink and downlink except those related to 3GPP PS_Data_Off Exempt Services. UEs are configured with a default list of 3GPP PS_Data_Off Exempt Services (e.g., in its universal subscriber identification module (USIM) or management object (MO)).

In accordance with one novel aspect, various issues and requirements are addressed to facilitate the support of 3GPP PS_Data_Off feature. In one example, signaling storms due to frequent PS_Data_Off reconfiguration are prevented. In another example, for multi-SIM devices and for devices that supporting WiFi access, UE reconfigures the PS_Data_Off feature upon a triggering condition is satisfied. In yet another example, upon status change of PS_Data_Off feature, UE initiates RAT change to improve performance and load balancing, reduce power consumption and cost, and maintain service continuity. Furthermore, new AT commands and parameters are introduced to enable the PS_Data_Off feature. In the example of FIG. 1, UE 114 comprises a TE, which is also referred to as an application processor (AP), and an MT, which is also referred to as a modulator/demodulator (modem). The AP can trigger the modem to start the PS_Data_Off indication procedure or to retrieve the PS_Data_Off status through the use of the new AT commands/parameters.

Figure 2:
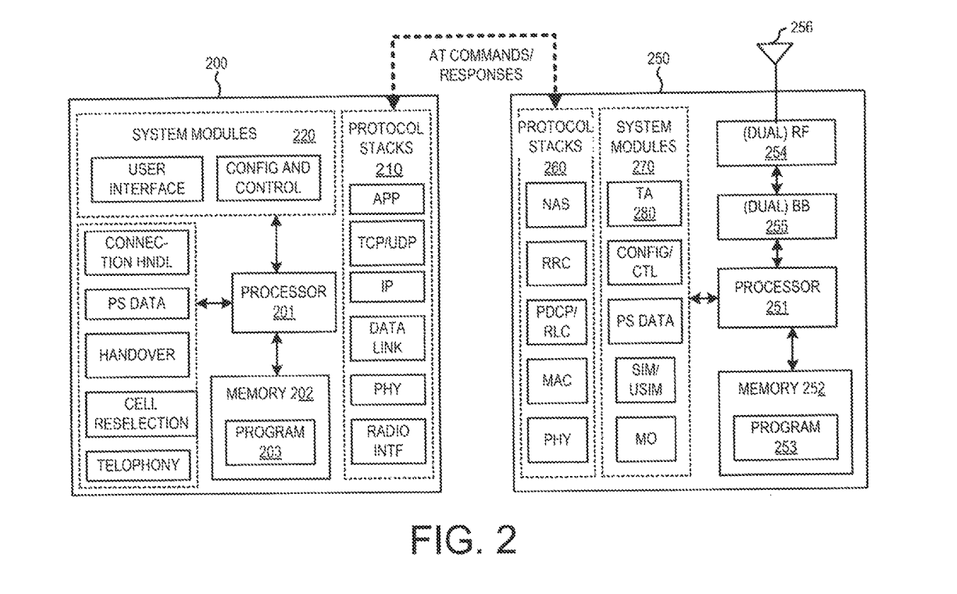
FIG. 2 illustrates simplified block diagrams of a user equipment (UE) including a terminal equipment (TE) and a mobile terminal (MT) in accordance with embodiments of the current invention.

FIG. 2 illustrates simplified block diagrams of a terminal equipment TE 200 and a mobile terminal MT 250 in accordance with embodiments of the current invention. TE 200 comprises a processor 201, memory 202, and protocol stacks 210 including Application (APP) layer, Transport (TCP/UDP) layer, Network (IP) layer, Data Link layer, Physical (PHY) layer, and radio interface. TE 200 further comprises system control modules 220 including a user interface, a configuration and control module, a connection handler, a PS Data module, a handover module, a cell reselection module, and a telephony circuit. Processor 201 processes different applications and invokes different system control modules to perform various features of TE 200. Memory 202 stores program instructions and data 203 to control the operations of TE 200. The system control modules and circuits that can be implemented by software, firmware and/or hardware, and configured to carry out functional tasks of TE 200.

For IP data service, TE 200 establishes one or multiple PDN connections to its target PDN. Upon PDN connection establishment, application data needs to be encapsulated and segmented at each layer, from higher layer to lower layer (e.g., TCP→IP→Data Link), and then transmitted in the PHY layer. The above functionalities are handled by the connection handler, the PS data controller, the handover module, and the cell reselection module, together with the protocol stacks 210. Typically, TE 200 is also equipped with telephony framework circuits (e.g., a dialer, a call manager etc.) to support voice call functionality. In addition, TE 200 also supports the AT commands as defined by 3GPP TS27.007 for controlling MT functions and GPRS packet domain services based on PDP contexts, which includes PS_Data_Off configuration for each of the established PDN connections.

MT 250 has an antenna 256, which transmits and receives radio signals. A RF or dual-RF transceiver module 254, coupled with the antenna, receives RF signals from antenna 256, converts them to baseband signals and sends them to processor 251 via baseband or dual-BB module 255. RF transceiver 254 also converts received baseband signals from processor 251 via baseband module 255, converts them to RF signals, and sends out to antenna 256. Processor 251 processes the received baseband signals and invokes different functional modules to perform features in MT 250. Memory 252 stores program instructions and data 253 to control the operations of MT 250.

MT 250 also comprises a set of protocol stacks 260 and control circuits including various system modules 270 to carry out functional tasks of MT 250. Protocol stacks 260 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 270 comprises a configuration and control module, a PS Data module for setting and reporting PS_Data_Off configuration, a SIM/USIM or dual SIM/USIM card, and a MO module. In the example of FIG. 2, MT 250 further comprises a Terminal Adaptor (TA 280) that receives and transmits AT commands and converts the AT commands to be processed by processor 251 for controlling MT functions. In one example, TA 280 receives an AT read command from a TE for the MT to retrieve PS_Data_Off configuration from the network. In another example, TA 280 receives an AT set command from a TE for changing PS_Data_Off configuration and send indication to the network.

The various function modules and control circuits of TE 200 and MT 250 may be implemented and configured by software, firmware, hardware, and/or combination thereof. The function modules and circuits, when executed by the processors via program instructions contained in the memory, interwork with each other to allow the base station and UE to perform embodiments and functional tasks and features in the network. In one example, each module or circuit comprises a processor (e.g., 201 or 251) together with corresponding program instructions.

Figure 3:
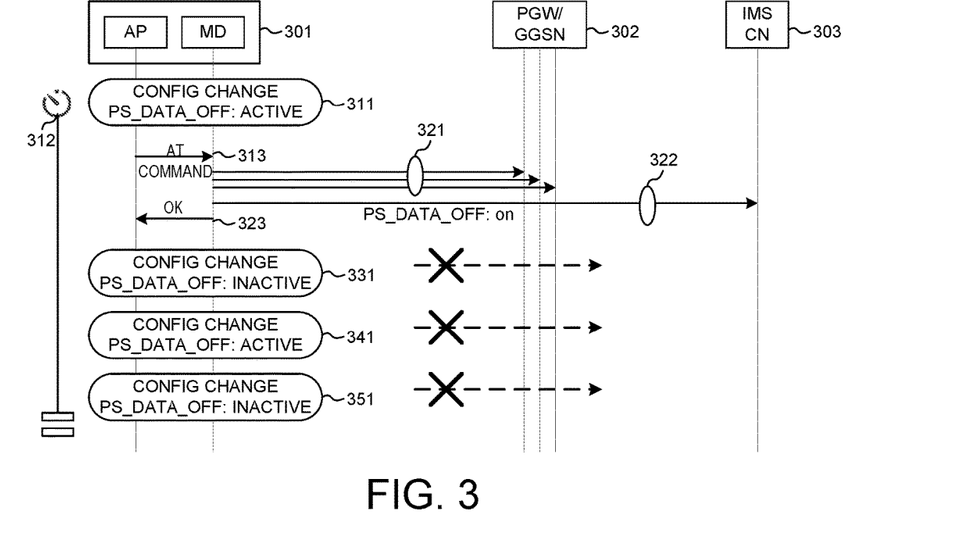
FIG. 3 illustrates a method of preventing signaling storm due to frequent PS Data Off reconfiguration in accordance with embodiments of the current invention.

FIG. 3 illustrates a method of preventing signaling storm due to frequent PS_Data_Off reconfiguration in accordance with embodiments of the current invention. When PS_Data_Off configuration is changed, a UE needs to inform the network about the latest PS_Data_Off configuration. However, if the PS_Data_Off configuration is changed frequently (e.g., by user or some malicious software), a serious NAS/SIP signaling storm is expected. Race conditions may occur in core network or IMS server where MME session Request for two consecutive active or inactive are sent with conflicting demand (delete or create session). The same problem may also occur with Dual SIM devices. In accordance with one novel aspect, a timer based solution can be adopted.

In the example of FIG. 3, UE 301 comprises a TE, which is also referred to as an application processor (AP), and an MT, which is also referred to as a modulator/demodulator (modem). In step 311, UE 301 changes its configuration to PS_Data_Off=active. Upon the configuration change, UE 301 starts a timer (step 312). In step 313, UE 301 sends an AT command from the AP to the modem. In response, the modem sends an enhanced session management or session management (ESM/SM) message to PGW 302 for each of the established PDN connections (step 321). The modem also sends a Session Initiation Protocol (SIP) message to IMS server 303 (step 322). The ESM/SM/SIP messages inform the PDN network and the IMS server PS_Data_Off feature is on. In step 323, the modem sends an ACK back to the AP. Later, UE 301 changes its configuration again. For example, in step 331, UE 301 changes its configuration to PS_Data_Off=inactive; In step 341, UE 301 changes its configuration to PS_Data_Off=active; In step 351, UE 301 changes its configuration to PS_Data_Off=inactive. However, since the timer is still running, UE 301 is prohibited from sending any PS_Data_Off related message to the network/ISM server to prevent signaling storm. UE 301 is only allowed to send messages upon such forbidden timer expires.

Note that there can be multiple timers for each PDN network and the IMS server. The timer(s) can be maintained in UE/network/both. The value(s) of the timer(s) could be transmitted via signaling (IMS/NAS/RRC/SIB), preconfigured via SIM/USIM/Management Object, or predefined. The timer values could also be different for roaming/non-roaming scenarios, different APNs, IMS/non-IMS domains, and for different configuration transitions (e.g., active to inactive, or inactive to active). The corresponding indication procedure could be all indication procedure, indication procedures within the same domain (e.g., IMS/non-IMS domain), indication procedures within the same APN, or indication procedures for the same configuration transition (e.g., active to inactive). Furthermore, if the timer is maintained in UE, then it could be maintained by the AP or the modem. If maintained by the AP, then the AP is refrained from sending addition AT commands while the timer is running. If maintained by the modem, then the modem is refrained from sending indications to the network while the timer is running.

Figure 4:
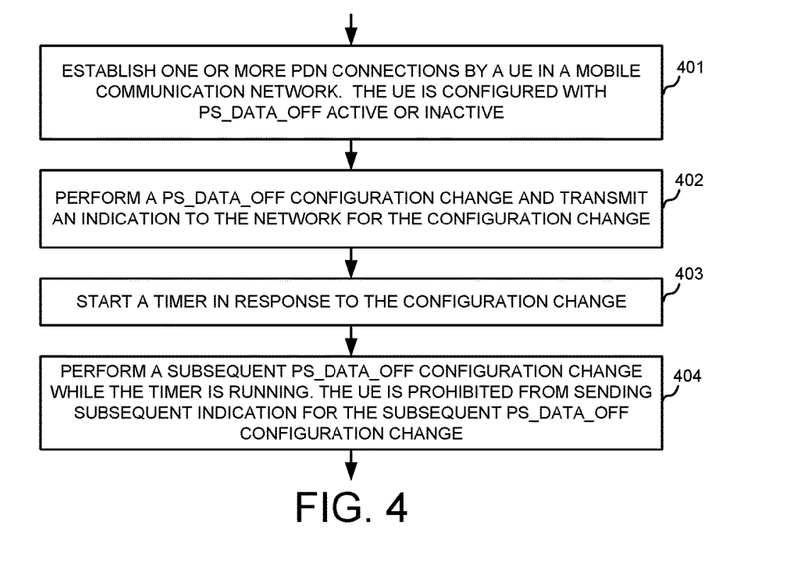
FIG. 4 is a flow chart of a method of preventing signaling storm due to frequent PS Data Off reconfiguration in accordance with one novel aspect.

FIG. 4 is a flow chart of a method of preventing signaling storm due to frequent PS_Data_Off configuration changes in accordance with one novel aspect. In step 401, a UE establishes one or more packet data network (PDN) connections in a mobile communication network. The UE is configured with packet-switched PS_Data_Off active or inactive. In step 402, the UE performs a PS_Data_Off configuration change and transmits an indication to the network for indicating the PS_Data_Off configuration change. In step 403, the UE starts a timer in response to the configuration change. In step 404, the UE performs a subsequent PS_Data_Off configuration change while the timer is running. The UE is prohibited from sending a subsequent indication to the network for the subsequent PS_Data_Off configuration change.

Figure 5:
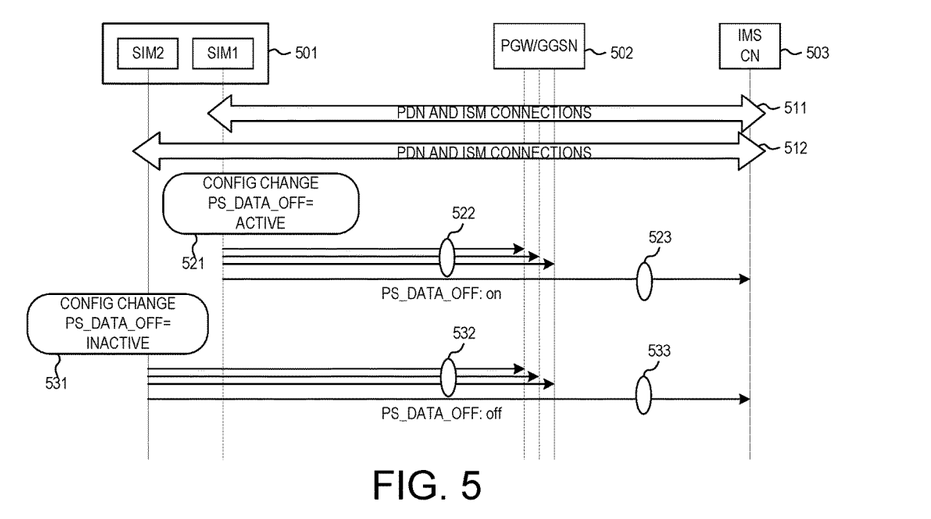
FIG. 5 illustrates one embodiment of supporting PS_Data_Off configuration for devices with multiple subscriber identification modules (SIMs) in accordance with embodiments of the current invention.

FIG. 5 illustrates one embodiment of supporting PS_Data_Off configuration for devices with multiple subscriber identification modules (SIMs) in accordance with embodiments of the current invention. For multi-SIM devices, currently there is only one PS data service allowed. A UE only allows its user to enable PS data service on one SIM card. Once the user turns on PS data on another SIM, the AP will automatically disable PS data on the original SIM. In one novel aspect, the selection of the PS data service on those available SIMs should be associated to the PS_Data_Off procedures. For multi-SIM devices where only one PS data service is allowed, the SIM for PS data should indicate PS_Data_Off=inactive, while the other SIM should indicate PS_Data_Off=active to the network. It is beneficial to indicate PS_Data_Off=active for the other SIM where no traffic is expected to avoid unexpected charging. Upon change of the PS data service, the SIMs should automatically perform the corresponding PS_Data_Off indication procedures.

In the example of FIG. 5, UE 501 is a multi-SIM device comprising a first SIM1 card and a second SIM2 card. In step 511, UE 501 establishes a first set of PDN and/or IMS connections over SIM1 with PGW 502 and/or IMS server 503. In step 512, UE 501 establishes a second set of PDN and/or IMS connections over SIM2 with PGW 502 and/or IMS server 503. Assume only one PS data service is allowed in UE 501, and SIM1 is for voice service and SIM2 is for PS data service (optionally also support voice service). In step 521, UE 501 configures SIM1 with PS_Data_Off=active. Accordingly, UE 501 sends an ESM/SM message to PGW 502 for each of the established first set of PDN connections (step 522). UE 501 also sends a SIP message to IMS server 503 (step 523). The ESM/SM/SIP messages inform the PDN networks and the IMS server that the PS_Data_Off feature is on for SIM1. As a result, PS data is disabled uplink and downlink for SIM1. In step 531, UE 501 configures SIM2 with PS_Data_Off=inactive. Accordingly, UE 501 sends an ESM/SM message to PGW 502 for each of the second set of established PDN connections (step 532). UE 501 also sends a SIP message to IMS server 503 (step 533). The ESM/SM/SIP messages inform the PDN networks and the IMS server that the PS_Data_Off feature is off for SIM2. As a result, PS data is enabled uplink and downlink for SIM2. Later, if SIM1/SIM2 changes its PS data service, then each SIM performs the corresponding PS_Data_Off indication procedures accordingly.

Figure 6:
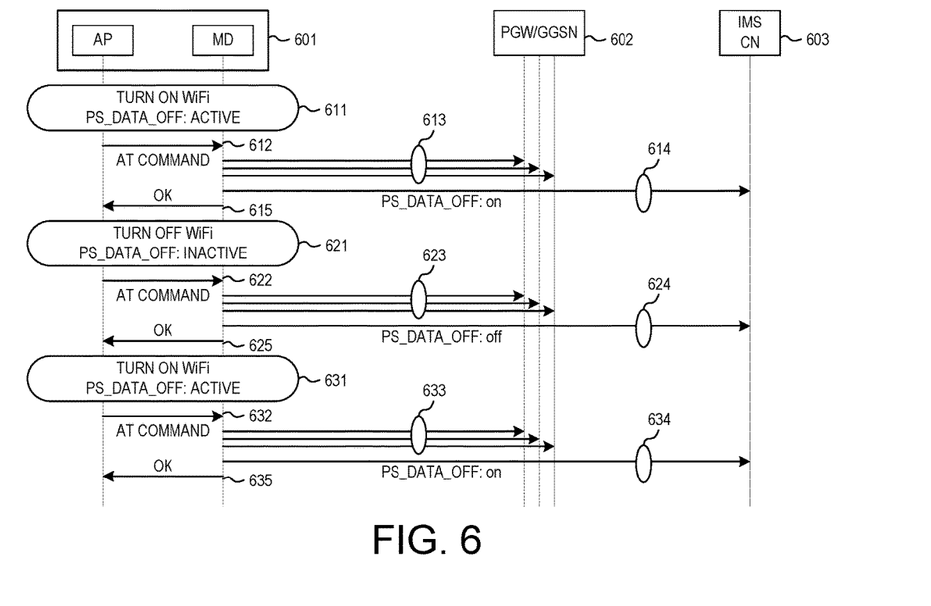
FIG. 6 illustrates one embodiment of supporting PS_Data_Off configuration for devices with WiFi capabilities in accordance with embodiments of the current invention.

FIG. 6 illustrates one embodiment of supporting PS_Data_Off configuration for devices with WiFi capabilities in accordance with embodiments of the current invention. Assume that the user sets PS_Data_Off=inactive. When using WiFi to access the Internet, the UE may still receive MT data from the mobile network. In this case, upon receipt of MT data from the mobile network, the modem will not deliver the data to upper layer. However, such MT data can lead to unexpected charge to the user. In one novel aspect, while the WiFi capability is turned on and in use, the UE could automatically send PS_Data_Off=active indication to the network for stopping the MT data. Consequently, if the configuration remains the same, when WiFi access is no longer available, the UE could automatically send PS_Data_Off=inactive to the network to resume PS data service.

In the example of FIG. 6, UE 601 comprises a TE, which is also referred to as an application processor (AP), and an MT, which is also referred to as a modulator/demodulator (modem). In step 611, UE 601 turns on the WiFi and changes its configuration to PS_Data_Off=active. In step 612, UE 601 sends an AT command from the AP to the modem. In response, the modem sends an ESM/SM message to PGW 602 for each of the established PDN connections (step 613). The modem also sends a SIP message to IMS server 603 (step 614). The ESM/SM/SIP messages inform the PDN networks and the IMS server PS_Data_Off feature is on. In step 615, the modem sends an ACK back to the AP. Later, in step 621, UE 601 turns off the WiFi and changes its configuration to PS_Data_Off=inactive. In step 622, UE 601 sends an AT command from the AP to the modem. In response, the modem sends an ESM/SM message to PGW 602 for each of the established PDN connections (step 623). The modem also sends a SIP message to IMS server 603 (step 624). The ESM/SM/SIP messages inform the PDN networks and the IMS server PS_Data_Off feature is off. When UE 601 again turns on the WiFi, UE 601 repeats steps 631 to 635 the same as steps 611 to 615.

Figure 7:
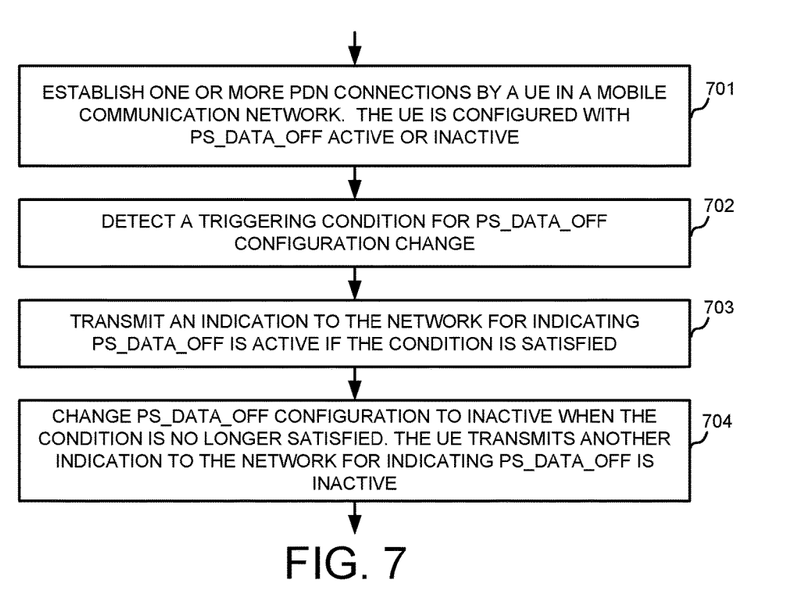
FIG. 7 is a flow chart of a method of supporting PS_Data_Off configuration in accordance with one novel aspect.

FIG. 7 is a flow chart of a method of supporting PS_Data_Off configuration in accordance with one novel aspect. In step 701, a UE establishes one or more packet data network (PDN) connections in a mobile communication network. The UE is configured with packet switch PS_Data_Off active or inactive. In step 702, the UE detects a triggering condition for PS_Data_Off configuration change. In step 703, the UE transmits an indication to the network for indicating PS_Data_Off is active if the triggering condition is satisfied. In step 704, the UE changes the PS_Data_Off configuration to inactive when the condition is no longer satisfied. The UE transmits another indication to the network for indicating PS_Data_Off is inactive.

Figure 8:
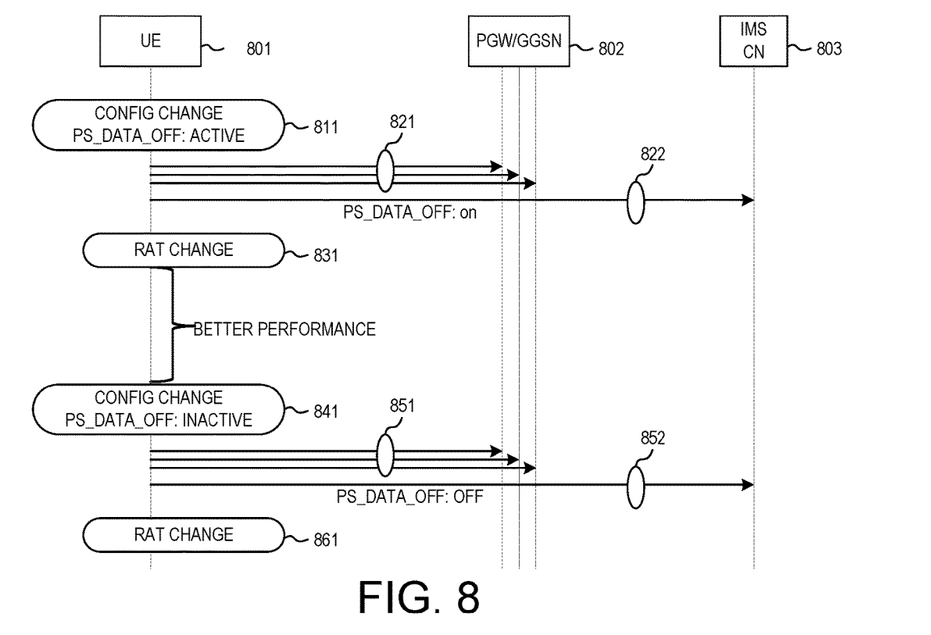
FIG. 8 illustrates one embodiment of supporting PS_Data_Off configuration with improved performance in accordance with embodiments of the current invention.

FIG. 8 illustrates one embodiment of supporting PS_Data_Off configuration with improved performance in accordance with embodiments of the current invention. Upon change of the PS_Data_Off configuration, the system performance could be improved by RAT change or voice call preference change. The target RAT could be selected by the following criteria: power centric (save power), cost centric (reduce cost), performance centric, network load balancing (traffic offloading), initial ATTACH or TAU result. The preferred voice call domain could be selected by the following criteria: available voice call mechanism (VoLTE, VoWiFi, CS call, etc.), and radio quality (e.g., WiFi, 2G, 3G, etc.).

In the example of FIG. 8, In step 811, UE 801 changes its configuration to PS_Data_Off=active. In step 821, UE 801 sends an ESM/SM message to PGW 802 for each of the established PDN connections. UE 801 also sends a SIP message to IMS server 803 (step 822). The ESM/SM/SIP messages inform the PDN networks and the IMS server that PS_Data_Off feature is on. To improve performance, in step 831, the current RAT or voice call preference is changed accordingly, e.g., from E-UTRAN to UTRAN. The RAT or voice call domain change can be triggered by the network via a handover command or by the UE via a cell reselection procedure. Later, in step 841, UE 801 changes its configuration to PS_Data_Off=inactive. In step 851, UE 801 sends an ESM/SM message to PGW 802 for each of the established PDN connections. UE 801 also sends a SIP message to IMS server 803 (step 852). The ESM/SM/SIP messages inform the PDN networks and the IMS server PS_Data_Off feature is off. In step 861, UE 801 may change the RAT or voice call preference again, e.g., from UTRAN to E-UTRAN to improve performance.

Figure 9:
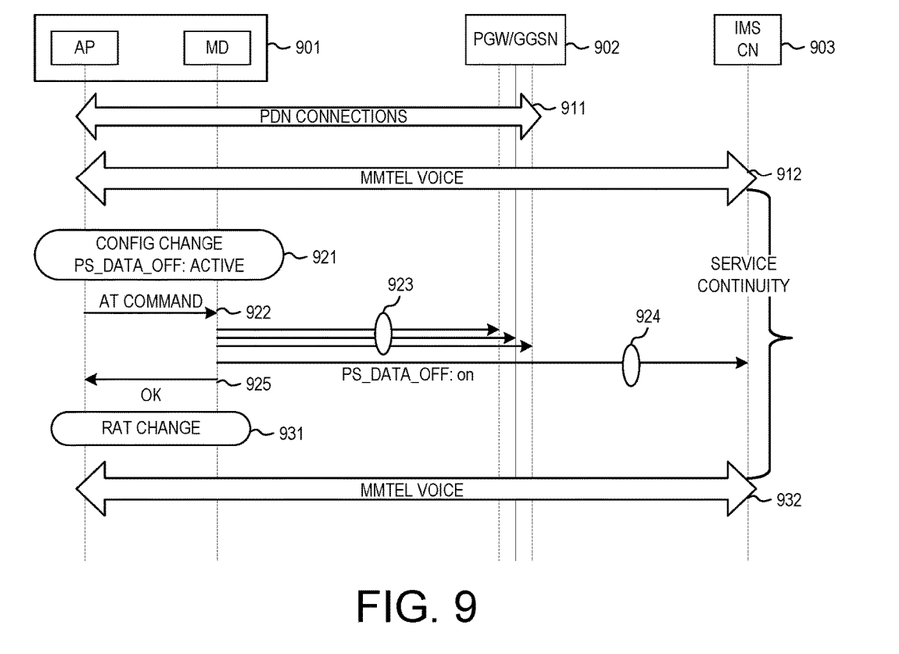
FIG. 9 illustrates one embodiment of supporting PS_Data_Off configuration with service continuity in accordance with embodiments of the current invention.

FIG. 9 illustrates one embodiment of supporting PS_Data_Off configuration with service continuity in accordance with embodiments of the current invention. Upon change of the PS_Data_Off configuration, the available service may be impacted when the user activates PS_Data_Off feature. For example, for an LTE_only UE, if the MMTel service is not included in the exempt services, then the voice service is disabled when the user activates PS_Data_Off. Note that 3GPP has defined a list of PS_Data_Off Exempt Services, which are allowed even if the 3GPP PS_Data_Off status is set to active in the UE by the user. Examples of the 3GPP PS_Data_Off Exempt Services include: MMTel Voice; SMS over IMS; USSD over IMS (USSI); MMTel Video; particular IMS services not defined by 3GPP, where each such IMS service is identified by an IMS communication service identifier; Device Management over PS; and IMS Supplementary Service configuration via the Ut interface using XCAP.

In the example of FIG. 9, in step 911, UE 901 establishes a set of PDN connections with PGW 902. In step 912, UE 901 establishes an IMS connection with IMS server 903 for MMTel voice service. In step 921, UE 901 changes its configuration to PS_Data_Off=active. In step 922, UE 901 sends an AT command from the AP to the modem. In response, the modem sends an ESM/SM message to PGW 902 for each of the established PDN connections (step 923). The modem also sends a SIP message to IMS server 903 (step 924). The ESM/SM/SIP messages inform the PDN networks and the IMS server that PS_Data_Off feature is on. In step 925, the modem sends an ACK back to the AP. If MMTel voice is not included in the exempt services, then MMTel voice service is no longer available for the user upon the PS_Data_Off configuration change. To maintain service continuity for the MMTel voice, in step 931, UE 901 selects another RAT to keep the service available. For example, UE 901 may handover the IMS connection to WLAN or performs a cell reselection for the RAT change when PS_Data_Off is activated. In step 932, UE 901 establishes a new IMS connection for the MMTel service.

Figure 10:
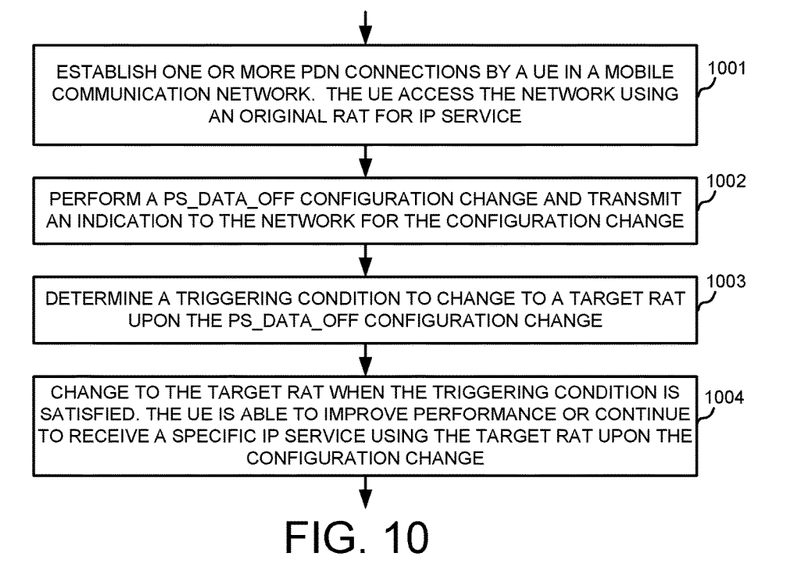
FIG. 10 is a flow chart of a method of supporting PS_Data_Off configuration in accordance with one novel aspect.

FIG. 10 is a flow chart of a method of supporting PS_Data_Off configuration in accordance with one novel aspect. In step 1001, a UE establishes a packet data network (PDN) connection in a mobile communication network. The UE access the network using an original radio access technology (RAT) for IP service. In step 1002, the UE performs a PS_Data_Off configuration change and transmitting an indication to the network for indicating the configuration change. In step 1003, the UE determining a triggering condition to change to a target RAT upon the PS_Data_Off configuration change. In step 1004, the UE changes to the target RAT when the triggering condition is satisfied. The UE is able to improve performance or continue to receive a specific IP service using the target RAT upon the configuration change.

At Command Requirement

Figure 11:
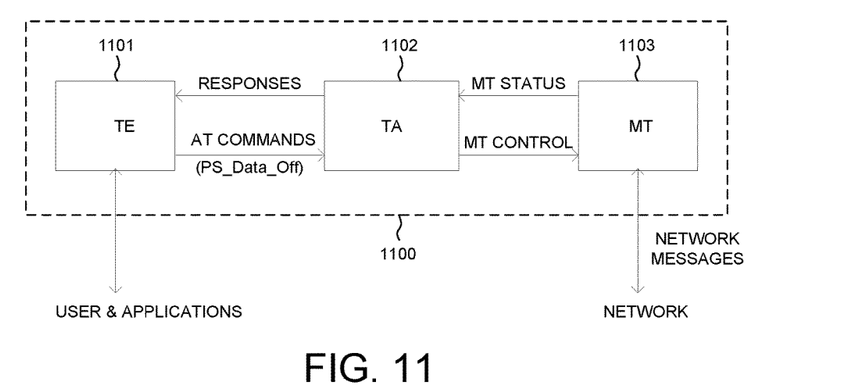
FIG. 11 illustrates a simplified block diagram of an architecture of a user equipment UE comprising a Terminal Equipment (TE) and a Mobile Termination (MT) interfaced by a Terminal Adaptor (TA) in accordance with one novel aspect.

FIG. 11 illustrates a simplified block diagram of an architecture of a user equipment UE 1100 comprising a Terminal Equipment (TE 1101) and a Mobile Termination (MT 1103) interfaced by a Terminal Adaptor (TA 1102) in accordance with one novel aspect. 3GPP TS 27.007 defines a plurality of AT commands for controlling MT functions and GPRS packet domain services based on PDP contexts. Each AT command includes a Context Identification (CID) parameter as reference to the specific PDP context (and the associated Radio Access Bearer (RAB)) to which the AT command applies. The TA, MT and TE may be implemented in the form of separate or integrated entities as needed. The span of control of the defined AT commands allows handling of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity.

In the example of FIG. 11, the AT commands are observed on the link between TE 1101 and TA 1102. However, most of the AT commands exchange information about the MT, not about the TA. The Interface between TE 1101 and TA. 1102 operates over existing serial cables, infrared link, and all link types with similar behavior. The interface between TA 1102 and MT 1103 depends on the interference within MT 1103. In one embodiment, TE 1101 sends an AT command to TA 1102, which converts to an MT control to be sent to MT 1103 to change the PS_Data_Off configuration. The AT commands can be a set command for setting PS_Data_Off configuration to active or inactive for MT 1103, or can be a read command for retrieving PS_Data_Off status from MT 1103. In response to the read command, MT 1103 sends PS_Data_Off status to TA 1102, which converts to a response to be sent to TE 1101.

Figure 12:
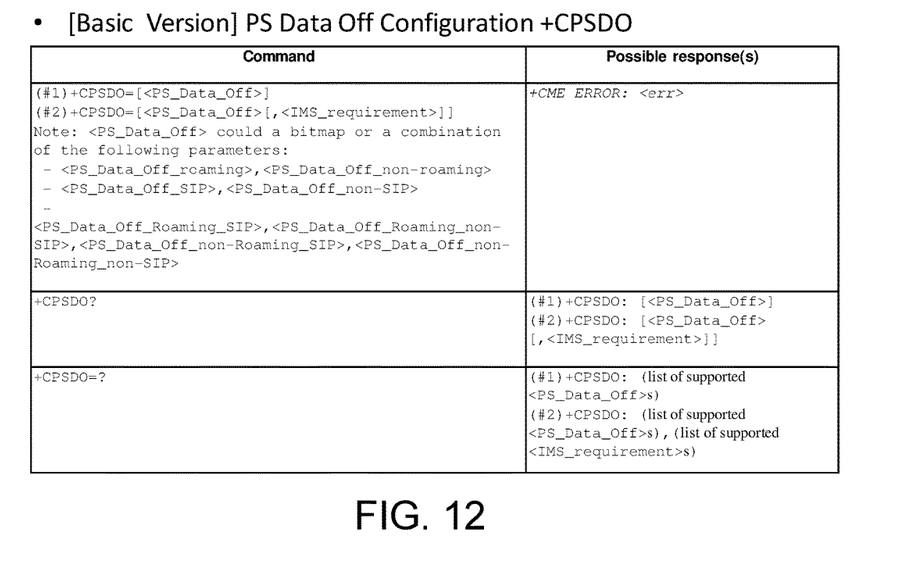
FIG. 12 illustrates a basic version of AT command for PS_Data_Off configuration.

FIG. 12 illustrates a basic version of AT command for PS_Data_Off configuration. AT commands are defined for TE (AP) side to inform the change or retrieve the status of PS_Data_Off configuration to/from the MT (modem) side. There are different versions of the AT commands. Under a basic version, as depicted in FIG. 12, a new AT command +CPSDO triggers PS_Data_Off indication procedure on all the PDN connections and the IMS connection. The AT+CPSDO command is a set or read or test command, and the AT+CPSDO command may include the following parameters. PS_Data_Off indication could be a single value or a bitmap of multiple settings. In one example, <PS_Data_Off>: integer type; 0: PS traffic is enabled, 1: PS traffic is disabled. In another example, <PS_Data_Off>: integer type; a bitmap that indicates the configuration of settings for each of <PS_Data_Off_Roaming_IMS>, <PS_Data_Off_Roaming_non-IMS>, <PS_Data_Off_non-Roaming_IMS>, <PS_Data_Off_non-Roaming_non-IMS>.

PS_Data_Off indication may be separated into roaming or non-roaming parts. In a first example, separate parameters: PS_Data_Off_Roaming, PS_Data_Off_non-Roaming. In a second example, the PS_Data_Off is a bitmap for roaming/non-roaming. PS_Data_Off indication may be separated into IMS or non-IMS parts. In a first example, separate parameters: PS_Data_Off_SIP, PS_Data_Off_non-SIP. In a second example, the PS_Data_Off is a bitmap for SIP/non-SIP. PS_Data_Off indication may be further separated into roaming/non-roaming, IMS/non-IMS parts. In a first example, separate parameters: PS_Data_Off_Roaming, PS_Data_Off_non-Roaming, PS_Data_Off_SIP, PS_Data_Off_non-SIP. In a second example, the PS_Data_Off is a bitmap for roaming/non-roaming and SIP/non-SIP.

Whether the IMS domain PS_Data_Off indication procedure is required is decided by AP or modem. If decision is made by the AP, then in a first option, a new AT command is defined for IMS domain. In a second option, an indication for IMS domain in the AT commands is set by the AP. For example, if the PDN connection is related to IMS, then the AP sets a parameter to trigger the IMS domain indication procedure. In a third option, the AP triggers the IMS domain indication procedure without interacting with the modem. If the decision is made by the modem, and if there is an IMS connection, then the IMS domain procedure is triggered upon receipt of the corresponding AT command from the AP.

Figure 13:
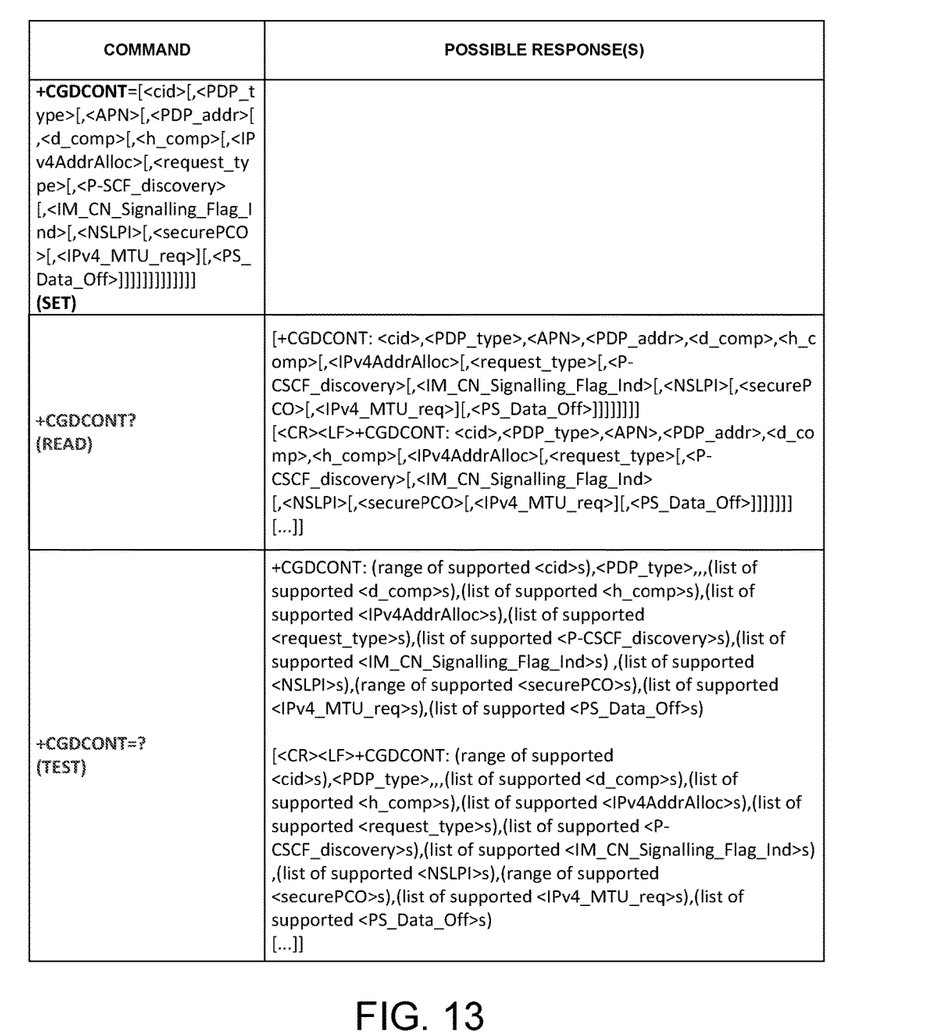
FIG. 13 illustrates a CID-based version of AT command for PS_Data_Off configuration.

FIG. 13 illustrates a cid-based version of AT command for PS_Data_Off configuration. Under cid-based version, an AT command triggers PS_Data_Off indication procedure on the corresponding PDN connection identified by the cid, and another AT command for the IMS connection may be required. For cid-based AT command, AT command (+CGDCONT) can be reused for configuring <PS_Data_Off> values. As illustrated in FIG. 13, the AT+CGDCONT command is a set or read or test command. The set command specifies PDP context parameters values for a PDP context identified by the local context identifier parameter <cid>. The execution of the read command returns the current settings for each defined context. The execution of the test command returns values supported as compound values. If the MT supports several PDP types, <PDP_type>, the parameter value ranges for each <PDP_type> are returned on a separate line.

The defined values of the relevant information include: <cid>: specifies a particular PDP context definition; <PDP type>: specifies the type of packet data protocol; <APN>: a logical name that is use to select the packet data network; <PDP_addr>: identifies the MT in the address space applicable to the PDP; <d_comp>: controls PDP data compression; <h_comp>: controls PDP header compression; <IPv4AddrAlloc>: controls how the MT/TA requests to get the IPv4 address information; <request_type>: indicates the type of PDP context activation request for the PDP context; <P-CSCF_discovery>: influences how the MT/TA requests to get the P-CSCF address; <IM_CN_Signaling_Flag_Ind>: indicates to the network whether the PDP context is for IM CN subsystem-related signaling only or not; <NSLPI>: indicates the NAS signaling priority requested for this PDP context; <securePCO>: specifies if security protected transmission of PCO is requested or not; <IPv4_MTU_discovery>: influences how the MT/TA requests to get the IPv4 MTU size; <PS_Data_Off>: specifies whether PS data is enabled or disabled for the PDP context.

Figure 14:
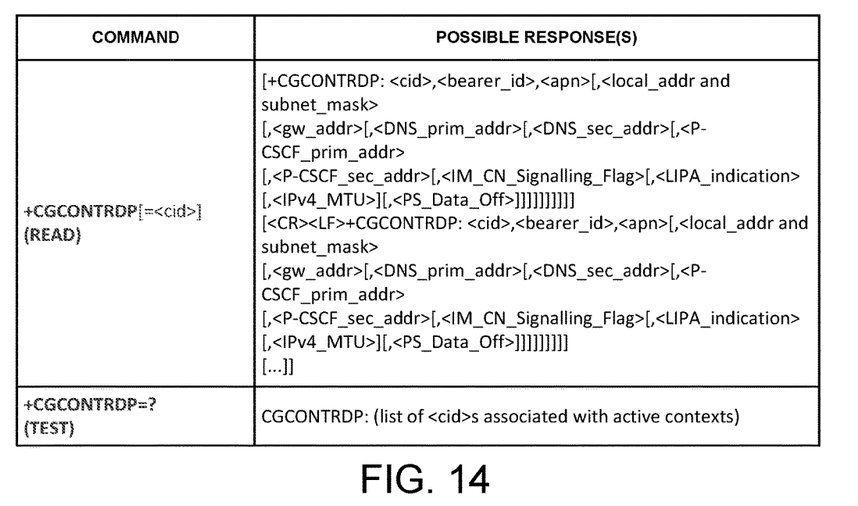
FIG. 14 illustrates a CID-based version of AT command for retrieving PS_Data_Off status.

FIG. 14 illustrates a CID-based version of AT command for retrieving PS_Data_Off status. As illustrated in FIG. 14, the AT+CGCONTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid>s associated with active non-secondary PDP contexts.

The defined values of the relevant information include: <cid>: a particular non-secondary PDP context identifier; <bearer-id>: identifiers the EPS bearer; <apn>: a logical name that was used to select the packet data network; <local_addr and subnet_mask>: shows the IP address and subnet mask of the MT; <gw_addr>: shows the Gateway Address of the MT; <DNS_prim_addr>: shows the IP address of the primary DNS server; <DNS_sec_addr>: shows the IP address of the secondary DNS server; <P_CSCF_prim_addr>: shows the IP address of the primary P-CSCF server; <P_CSCF_sec_addr>: shows the IP address of the secondary P-CSCF server; <IM_CN_Signaling_Flag>: shows whether the PDN context is for IM CN subsystem-related signaling only or not; <LIPA_indication>: indicates that the PDP context provides connectivity using LIPA PDN connection; <IPv4 MTU>: shows the IPv4 MTU size in octets; and <PS_Data_Off>: shows whether the PS_Data_Off feature is active or inactive.

Figure 15:
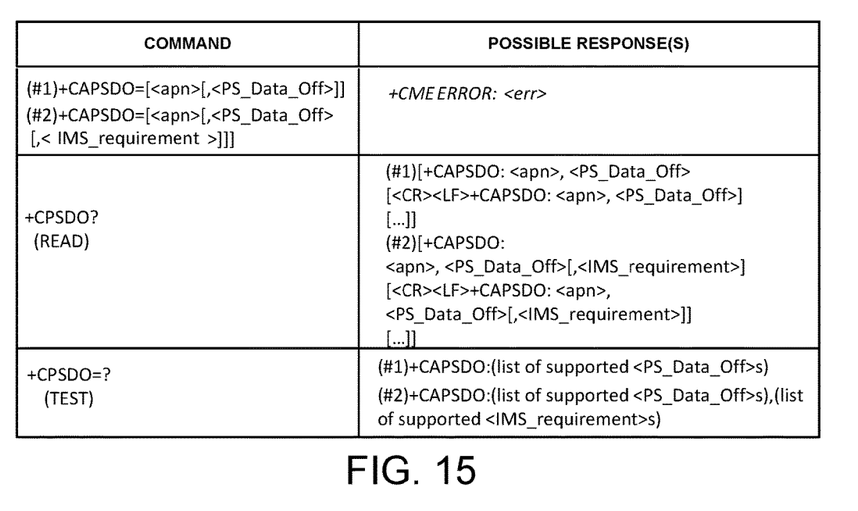
FIG. 15 illustrates an APN-based version of AT command for PS_Data_Off configuration.

FIG. 15 illustrates an APN-based version of AT command for PS_Data_Off configuration. Under APN-based version, an AT command triggers PS_Data_Off indication procedure on the corresponding PDN connection identified by the access point name (APN). For APN-based AT command, the new AT command (+CAPSDO) can be used for configuring <PS_Data_Off> values for the APN. As illustrated in FIG. 15, the AT+CAPSDO command is a set or read or test command. The set command specifies <PS_Data_Off> values and <IMS requirement> values for the APN identified by identifier parameter <apn>. The execution of the read command returns the current settings for each defined context. The execution of the test command returns values supported as compound values.

The defined values of the relevant information for AT command +CAPSDO include: <apn>: string type—A logical name that was used to select the GGSN or the external data network; <PS_Data_Off>: integer type or bitmap—used to indicate whether PS data is disabled or enabled for the APN; <IMS_requirement>: integer type—used to indicate whether IMS domain PS_Data_Off indication procedure is required for the APN. See FIG. 12 for detailed description of the defined values.

Figure 16:
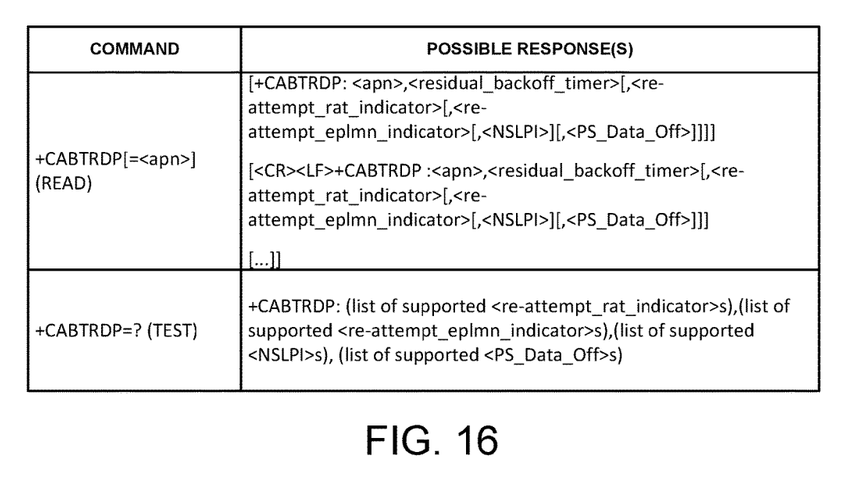
FIG. 16 illustrates an APN-based version of AT command for retrieving PS_Data_Off status.

FIG. 16 illustrates an APN-based version of AT command for retrieving PS_Data_Off status. As illustrated in FIG. 16, the AT+CABTRDP command is a read or test command. The execution of the read command returns the relevant information for an APN in the current RAT and PLMN combination. If the parameter <apn> is omitted in the AT command, then the relevant information for all APNs associated with session management backoff timers in the current RAT and PLMN combination is returned. The execution of the test command returns values supported as compound values.

The defined values of the relevant information for AT command +CABTRDP include: <apn>: string type—A logical name that was used to select the GGSN or the external data network; <residual backoff timer>: integer type—Indicate the residual back-off timer value associated with the <apn> in seconds; <re-attempt-rat-indicator>: integer type—Indicate whether the UE is allowed to re-attempt the corresponding session management procedure for the same APN after inter-system change. A value of 0 indicates that re-attempt the session management procedure after inter-system change is allowed. A value of 1 indicates that re-attempt the session management procedure after inter-system change is not allowed; <re-attempt_eplmn_indicator>: integer type—Indicate whether the UE is allowed to re-attempt the corresponding session management procedure for the same APN in an equivalent PLMN. A value of 0 indicates that re-attempt the session management procedure in an equivalent PLMN is allowed. A value of 1 indicates that re-attempt the session management procedure in an equivalent PLMN is not allowed; <NSLPI>: integer type—Indicates the NAS signaling priority requested for this PDN connection; <PS_Data_Off>: integer type—Indicates whether the PS_Data_Off feature is active or inactive.

Figure 17:
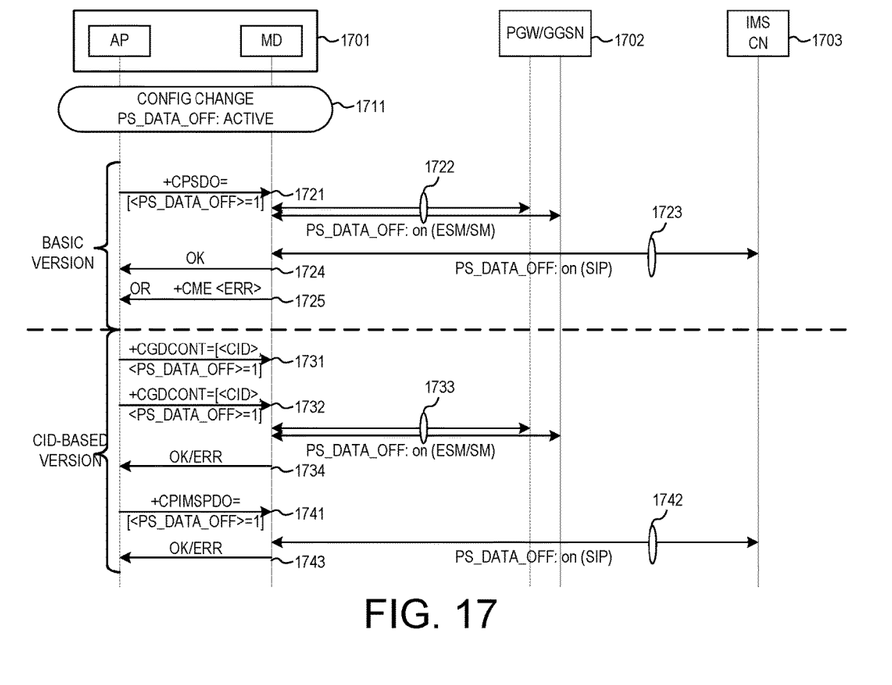
FIG. 17 illustrates a sequence flow of using AT command for setting PS_Data_Off configuration in accordance with embodiments of the current invention.

FIG. 17 illustrates a sequence flow of using AT command for setting PS_Data_Off configuration in accordance with embodiments of the current invention. UE 1701 comprises a TE, which is also referred to as an application processor (AP), and an MT, which is also referred to as a modulator/demodulator (modem). In step 1711, UE 1701 decides to disable PS data traffic and changes its configuration to PS_Data_Off=active. In a first option, in step 1721, UE 1701 sends an AT command AT+CPSDO from the AP to the modem. Under the basic version of AT command, AT+CPSDO triggers the PS_Data_Off indication procedure on all the PDN connections and IMS connection. As a result, in step 1722, the modem sends an ESM/SM message to PGW 1702 for each of the established PDN connections. The modem also sends a SIP message to IMS server 1703 (step 1723). The ESM/SM/SIP messages inform the PDN networks and the IMS server PS_Data_Off feature is on and PS data traffic is disabled. In step 1724, the modem sends an ACK back to the AP. Alternatively, in step 1725, the modem sends an error message back to the AP.

In a second option, CID-based version of AT command is used. Under the CID-based version of AT command, AT+CGDCONT triggers the PS_Data_Off indication procedure on the corresponding PDN connection identified by the CID. In step 1731, UE 1701 sends an AT command AT+CGDCONT from the AP to the modem with CID identifying a first PDN1. In step 1732, UE 1701 sends an AT command AT+CGDCONT from the AP to the modem with CID identifying a second PDN2. As a result, in step 1733, the modem sends an ESM/SM message to PGW 1702 for each of the established PDN connections PDN1 and PDN2, respectively. The ESM/SM/SIP messages inform the PDN networks PS_Data_Off feature is on and PS data traffic is disabled. In step 1734, the modem sends an ACK/error back to the AP. Furthermore, another IMS domain PS_Data_Off indication procedure may be required. If such decision is made by the modem, then the modem simply triggers a SIP message to inform the IMS service. On the other hand, if such decision is made by the AP, then in step 1741 the AP sends a new AT command AT+CPIMSPDO= [<PS_Data_Off>=1] to the modem. In response, the modem sends a SIP message to IMS server 1703 (step 1742). In step 1743, the modem sends an ACK/error back to the AP.

Figure 18:
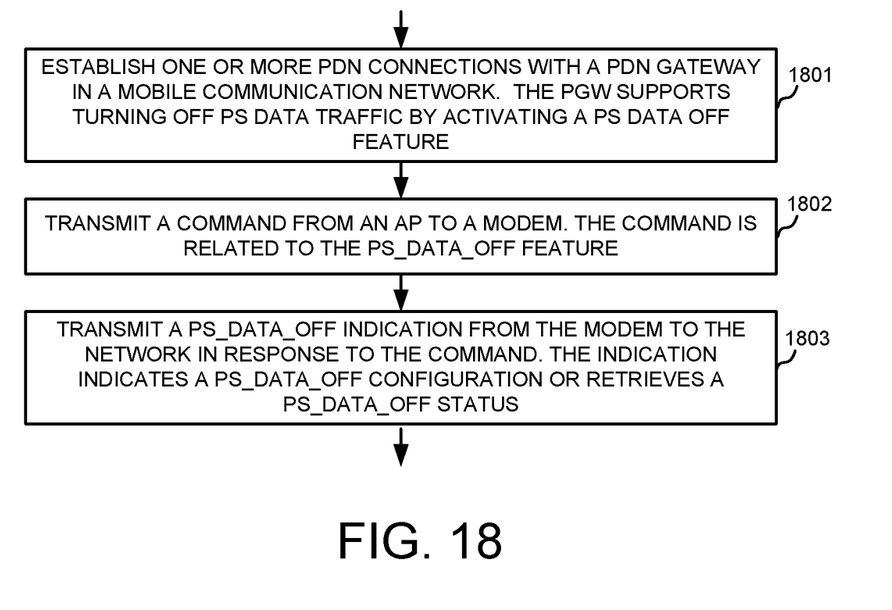
FIG. 18 is a flow chart of a method of using AT command for supporting PS_Data_Off configuration in accordance with one novel aspect.

FIG. 18 is a flow chart of a method of using AT command for supporting PS_Data_Off configuration in accordance with one novel aspect. In step 1801, a UE establishes one or more packet data network (PDN) connections with a PDN gateway (PGW) in a mobile communication network. The PGW supports turning off packet-switched data traffic by activating a PS_Data_Off feature. In step 1802, the UE transmits a command from an Application Processor (AP) to a modem. The command is related to the PS_Data_Off feature. In step 1803, the UE transmits an PS_Data_Off indication from the modem to the network in response to the command, wherein the indication indicates a PS_Data_Off configuration or retrieves a PS_Data_Off status.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    establishing one or more packet data network (PDN) connections by a user equipment (UE) in a mobile communication network, wherein the UE is configured with packet-switched PS_Data_Off active or inactive;
    performing a PS_Data_Off configuration change and transmitting one or more indications to the network for indicating the configuration change;
    starting a timer in response to the PS_Data_Off configuration change; and
    performing a subsequent PS_Data_Off configuration change while the timer is running, wherein the UE is prohibited from sending a subsequent indication for the subsequent configuration change.

2. The method of claim 1, wherein the UE comprises a terminal equipment (TE) and a mobile termination (MT), and wherein the MT transmits the indication in response to an Attention (AT) command from the TE.

3. The method of claim 1, wherein the indication is sent via an enhanced session management (ESM/SM) message to a PDN gateway.

4. The method of claim 1, wherein the UE has established an IP multimedia subsystem (IMS) connection, and wherein the indication is sent via a session initiation protocol (SIP) message to an IMS server.

5. The method of claim 1, wherein the UE maintains multiple timers having different timer values.

6. The method of claim 1, wherein the timer has a timer value based at least on one of a roaming or non-roaming scenario, an access point name (APN), a service domain, and a configuration change direction.

7. The method of claim 1, wherein the timer value is configured based on one of a signaling from the network, a preconfigured value, or a predefined value.

8. A method, comprising:
    establishing one or more packet data network (PDN) connections by a user equipment (UE) in a mobile communication network, wherein the UE is configured with packet switch PS_Data_Off active or inactive;
    detecting a triggering condition for PS_Data_Off configuration change;
    transmitting an indication to the network for indicating PS_Data_Off is active if the triggering condition is satisfied; and
    changing the PS_Data_Off configuration from active to inactive when the triggering condition is no longer satisfied, wherein the UE transmits another indication to the network for indicating PS_Data_Off is inactive.

9. The method of claim 8, wherein the UE comprises a terminal equipment (TE) and a mobile termination (MT), and wherein the MT transmits the indication in response to an Attention (AT) command from the TE.

10. The method of claim 8, wherein the UE is equipped with multiple subscriber identification modules (SIMs), and wherein the UE establishes a first PDN connection over a first SIM and establishes a second PDN connection over a second SIM.

11. The method of claim 10, wherein the condition is satisfied when the first SIM is configured and used for PS data services, and wherein the indication is sent to indicate that PS_Data_Off is active for the second PDN connection.

12. The method of claim 8, wherein the UE is capable to accessing the network for PS data services via a WiFi interface.

13. The method of claim 12, wherein the condition is satisfied when the UE turns on the WiFi interface for PS data services.

14. A method, comprising:
   establishing a packet data network (PDN) connection by a user equipment (UE) in a mobile communication network, wherein the UE access the network using an original radio access technology (RAT) for IP service;
   performing a PS_Data_Off configuration change and transmitting one or more indications to the network for indicating the configuration change;
   determining a triggering condition to change to a target RAT upon the PS_Data_Off configuration change; and
   changing to the target RAT when the triggering condition is satisfied, wherein the UE is able to improve performance or continue to receive a specific IP service using the target RAT upon the PS_Data_Off configuration change.

15. The method of claim 14, wherein the UE comprises a terminal equipment (TE) and a mobile termination (MT), and wherein the MT transmits the indication in response to an Attention (AT) command from the TE.

16. The method of claim 14, wherein the RAT change is achieved via UE performing a cell reselection procedure.

17. The method of claim 14, wherein the RAT change is achieved via UE receiving a handover command from the network.

18. The method of claim 14, wherein the triggering condition is satisfied when the UE detects that the UE can reduce power consumption or save cost in the target RAT.

19. The method of claim 14, wherein the triggering condition is satisfied when the UE detects that the specific IP service is supported in the target RAT but not in the original RAT after the PS_Data_Off configuration change.

* * * * *